US012682302B2

(12) United States Patent
Zhang

(10) Patent No.: US 12,682,302 B2
(45) Date of Patent: Jul. 14, 2026

(54) DECLARATIVE CODE-LESS WORKFLOW USING LLM

(71) Applicant: Microsoft Technology Licensing, LLC, Redmond, WA (US)

(72) Inventor: Yu Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 18/544,004

(22) Filed: Dec. 18, 2023

(65) Prior Publication Data

US 2025/0200475 A1     Jun. 19, 2025

(51) Int. Cl.
*G06Q 10/0633*     (2023.01)

(52) U.S. Cl.
CPC .................................. *G06Q 10/0633* (2013.01)

(58) Field of Classification Search
CPC ........................................... G06Q 10/00–50/00
USPC ................................................. 705/7.11–7.42
See application file for complete search history.

(56) References Cited

U.S. PATENT DOCUMENTS

| | | | | |
|---|---|---|---|---|
| 11,429,351 | B2 * | 8/2022 | Nayak .................. | G06N 3/0442 |
| 2004/0181614 | A1 * | 9/2004 | Furtek .................. | G06F 13/385 |
| | | | | 710/21 |
| 2006/0074734 | A1 * | 4/2006 | Shukla ...................... | G06F 8/10 |
| | | | | 717/107 |
| 2007/0200857 | A1 * | 8/2007 | Scheuermann ........ | H04N 19/42 |
| | | | | 375/E7.1 |

| | | | | |
|---|---|---|---|---|
| 2010/0211420 | A1 * | 8/2010 | Kodi ...................... | G06Q 10/06 |
| | | | | 717/140 |
| 2018/0165604 | A1 * | 6/2018 | Minkin .................. | G06Q 10/06 |
| 2023/0376838 | A1 * | 11/2023 | El Hattami ............. | G06F 40/35 |
| 2023/0385026 | A1 * | 11/2023 | El Hattami ............... | G06F 8/30 |
| 2023/0393903 | A1 * | 12/2023 | Kumar .................. | G06F 9/5038 |
| 2024/0256762 | A1 * | 8/2024 | Beauchamp .......... | G06F 40/166 |
| 2024/0311546 | A1 * | 9/2024 | Maschmeyer ........ | G06F 40/106 |

(Continued)

FOREIGN PATENT DOCUMENTS

| | | | | | |
|---|---|---|---|---|---|
| EP | 1643427 | A1 * | 4/2006 | ............. | G06F 8/316 |
| TR | 2024013742 | A2 * | 10/2024 | | |
| WO | WO-0034909 | A1 * | 6/2000 | ............. | G06Q 10/06 |

OTHER PUBLICATIONS

Zeng, Zhen, et al. "FlowMind: automatic workflow generation with LLMs." Proceedings of the Fourth ACM International Conference on AI in Finance. 2023. (Year: 2023).*

(Continued)

*Primary Examiner* — Alan S Miller
(74) *Attorney, Agent, or Firm* — ArentFox Schiff LLP

(57)     ABSTRACT

Example implementations include a method, apparatus, and computer-readable medium configured for implementing a workflow using a large language model (LLM). A workflow automation application sends a first prompt to a large language model (LLM) to transform a first input data source in a first format to a second format. The workflow automation application sends a second prompt to the LLM to define multiple steps of a workflow starting on the data source in the second format. The workflow automation application sends a third prompt to the LLM to define execution of business logic for each step of the workflow. The workflow automation application receives, from the LLM, output data indicating that each step of the workflow has been executed.

18 Claims, 8 Drawing Sheets

(56) References Cited

U.S. PATENT DOCUMENTS

| | | | | |
|---|---|---|---|---|
| 2024/0338248 | A1* | 10/2024 | Bose | G06F 9/451 |
| 2025/0028759 | A1* | 1/2025 | Castillo | G06F 16/838 |
| 2025/0045848 | A1* | 2/2025 | Focke | G06Q 10/103 |
| 2025/0117432 | A1* | 4/2025 | Curran | G06F 16/9032 |

OTHER PUBLICATIONS

Nishat, Atika, and Zillay Huma. "Leveraging Generative AI for Automated Infrastructure-as-Code Generation in Cloud Systems." Global Knowledge Academy 4.4 (2023): 8-13. (Year: 2023).*
International Search Report and Written Opinion received for PCT Application No. PCT/US2024/055301, Feb. 24, 2025, 14 pages.
Zhang, et al., "Reverse Chain: A Generic-Rule for LLMs to Master Multi-API Planning", arXiv:2310.04474v2, Oct. 10, 2023, XP 093160249, 14 Pages.

* cited by examiner

200

400

400

---

Workflow Automation Application

410

Business Logic Implementation:

Step 1:

```
Call Account API on <API Schema> by posting JSON data to a REST API
endpoint at https://reqbin.com/echo/post/json using Java import java.net.HttpURLConnection;
import java.net.URL;
import java.io.OutputStreamWriter;

public class PostJson {
    public static void main(String[] args) throws Exception {
        URL url = new URL("https://reqbin.com/echo/post/json");
        HttpURLConnection connection = (HttpURLConnection)
url.openConnection();
        connection.setRequestMethod("POST");
        connection.setRequestProperty("Content-Type", "application/json");
        connection.setRequestProperty("Accept", "application/json");
        connection.setDoOutput(true);
        String jsonInputString = "{<API Schema> }";
        try (OutputStreamWriter outputStreamWriter = new
OutputStreamWriter(connection.getOutputStream())) {
            outputStreamWriter.write(jsonInputString);
        }
        int responseCode = connection.getResponseCode();
        System.out.println("Response Code : " + responseCode);
    }
}
```

460

Step 2:

```
Execute priority.exe on  <Json schema 2>
```

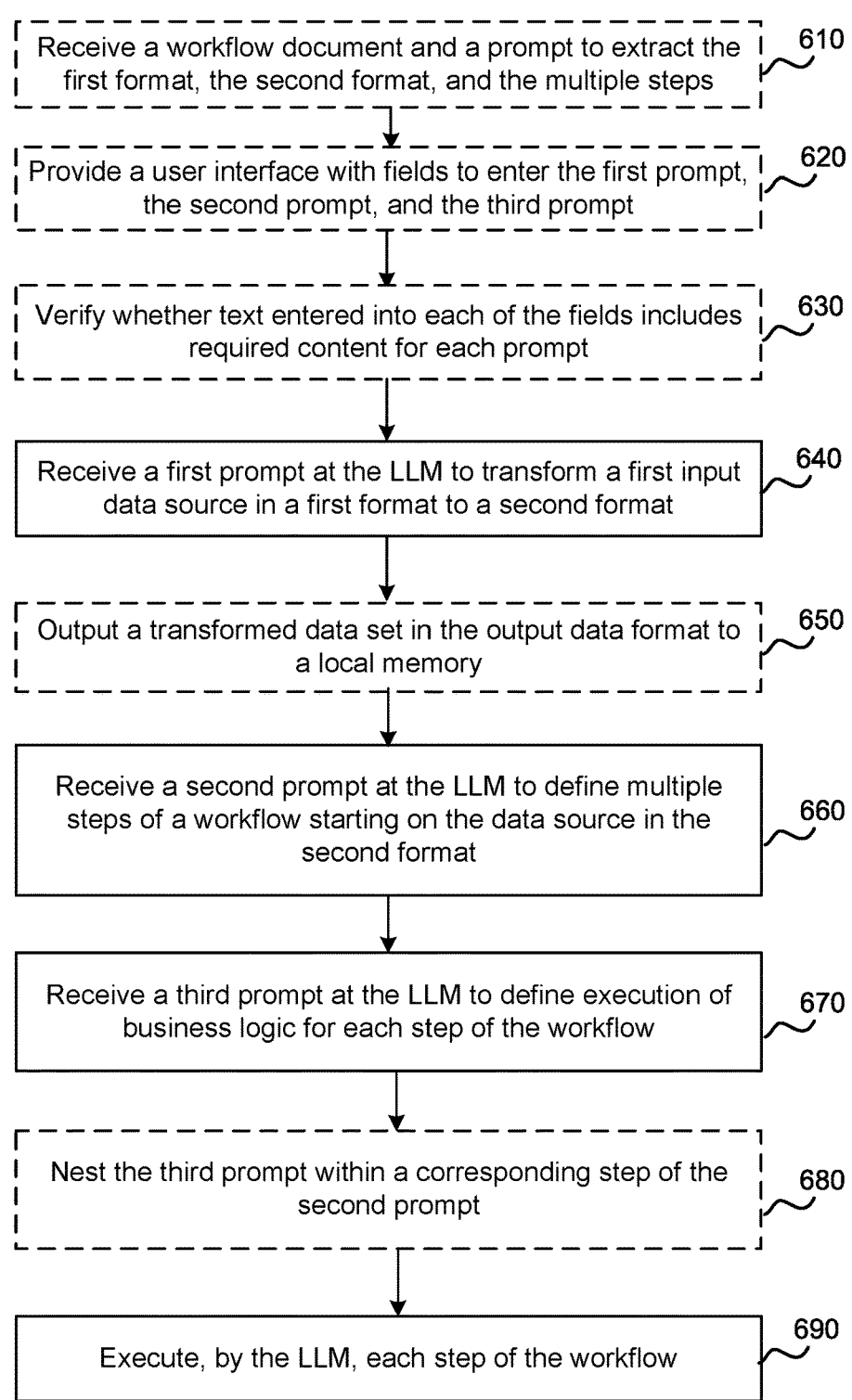

Receive a workflow document and a prompt to extract the first format, the second format, and the multiple steps  610

Provide a user interface with fields to enter the first prompt, the second prompt, and the third prompt  620

Verify whether text entered into each of the fields includes required content for each prompt  630

Receive a first prompt at the LLM to transform a first input data source in a first format to a second format  640

Output a transformed data set in the output data format to a local memory  650

Receive a second prompt at the LLM to define multiple steps of a workflow starting on the data source in the second format  660

Receive a third prompt at the LLM to define execution of business logic for each step of the workflow  670

Nest the third prompt within a corresponding step of the second prompt  680

Execute, by the LLM, each step of the workflow  690

Figure 6

DECLARATIVE CODE-LESS WORKFLOW USING LLM

TECHNICAL FIELD

The present disclosure relates to workflow automation including declarative code-less workflows using a large language model (LLM).

BACKGROUND

Computer software improves efficiency of organizations by automating workflows that have conventionally been performed by humans. Conventionally, automated workflows may be implemented as stand-alone local applications or web-services. Stand-alone local applications may provide a specific solution for a workflow but require intensive programming and maintenance. Web services, which may be implemented on remote servers or cloud networks, offer advantages such as remote access, portability and scalability, but may still require intensive programming and maintenance.

Further, although cloud platforms may offer similar services to support workflows, the programming and maintenance is often specific for a program. For instance, a cloud platform may have programming language or data model requirements. This means that when a workflow need to be run on a different platform based on a different programming model, developers repeatedly write code again for each platform/programming model.

Additionally, when a workflow changes or new business logic is introduced, new code must be written and deployed. This issue of maintenance is further complicated when the workflow is implemented on multiple platforms and requires updates to each platform. A similar issue may occur when the platforms use different data models, which may require different parsing for each platform. Another issue occurs with integration to external resources and downstream destinations. For example, application programming interfaces (APIs) or libraries may need to be modified or customized for each platform. In view of the foregoing, improvements in systems for workflow automation are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method of implementing a workflow using a large language model (LLM) including: receiving a first prompt at the LLM to transform a first input data source in a first format to a second format; receiving a second prompt at the LLM to define multiple steps of a workflow starting on the data source in the second format; receiving a third prompt at the LLM to define execution of business logic for each step of the workflow; and executing, by the LLM, each step of the workflow.

In some aspects, the techniques described herein relate to an apparatus including: one or more memories; and one or more processors coupled with the memory and, individually or in combination, configured to: send a first prompt to a large language model (LLM) to transform a first input data source in a first format to a second format; send a second prompt to the LLM to define multiple steps of a workflow starting on the data source in the second format; send a third prompt to the LLM to define execution of business logic for each step of the workflow; and receive, from the LLM, output data indicating that each step of the workflow has been executed.

In some aspects, the techniques described herein relate to a non-transitory computer-readable medium having computer-executable instructions stored thereon that when executed by a computer processor cause the computer processor to: send a first prompt to a large language model (LLM) to transform a first input data source in a first format to a second format; send a second prompt to the LLM to define multiple steps of a workflow starting on the data source in the second format; send a third prompt to the LLM to define execution of business logic for each step of the workflow; and receive, from the LLM, output data indicating that each step of the workflow has been executed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A and 4B are diagrams of an example user interface 400 for a workflow automation application for generating prompts.

FIG. 6 is a flow diagram of an example of a method for executing a workflow using a LLM.

DETAILED DESCRIPTION

Figure 1:
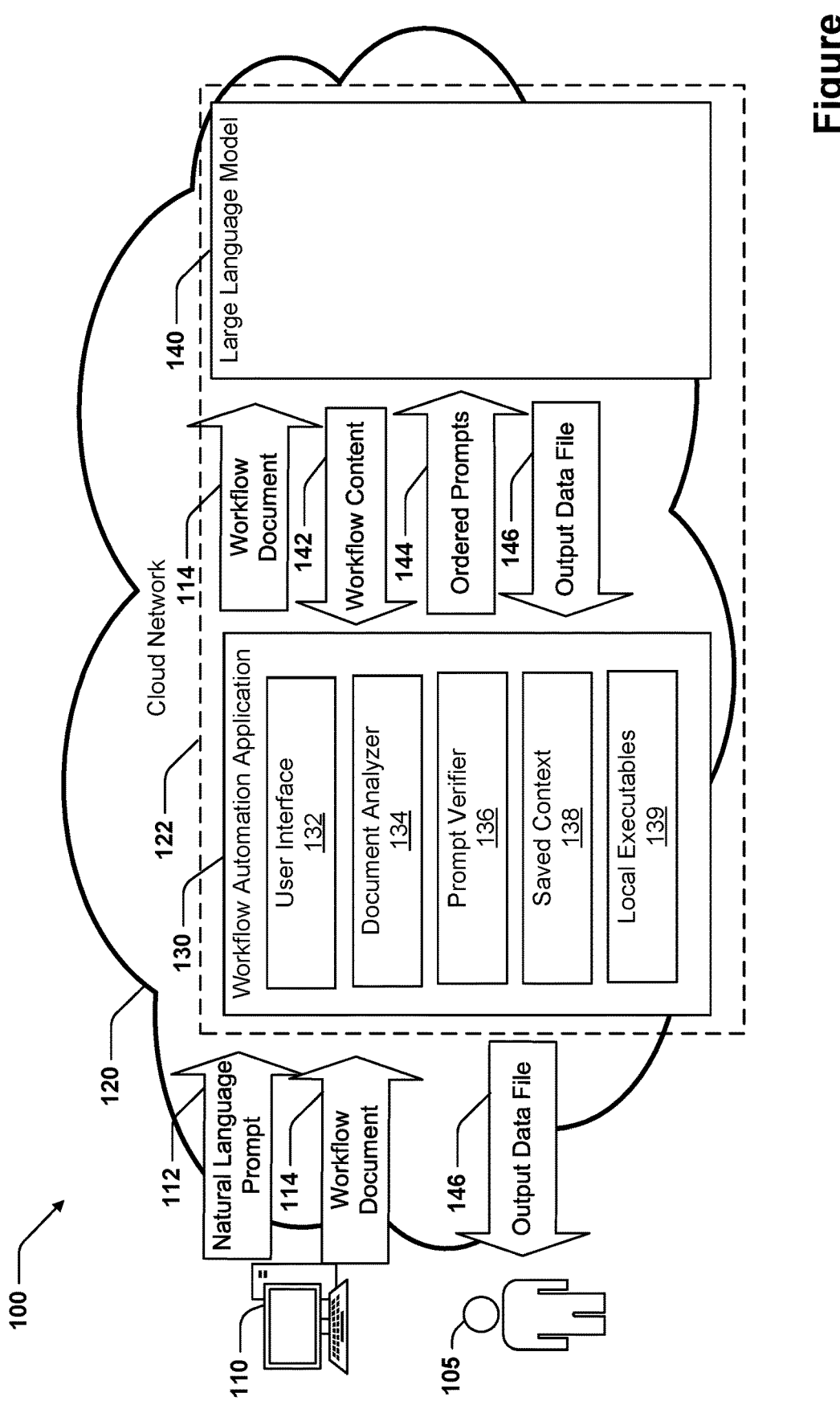
FIG. 1 is a diagram of an example of an architecture for a system to automate a workflow using a large language model (LLM), in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to workflow automation using declarative code-less workflows implemented on one or more large language models (LLMs). Instead of programming a specific platform for executing software with a particular data model or programming model, a workflow may be implemented as a series of prompts to an LLM. The prompts may use natural language, symbolic language, and/or pseudocode to define inputs, orchestration, and business logic of a workflow. The LLM may operate directly on the prompts to perform the defined steps of the workflow. In some cases, the workflow may integrate with existing code by asking the LLM to execute the code via an API, local executable code, or external executable.

Large Language Model (LLM) is a term that refers to artificial intelligence or machine-learning models that can generate natural language texts from large amounts of data. Large language models use deep neural networks, such as transformers, to learn from billions or trillions of words, and to produce texts on any topic or domain. Large language models can also perform various natural language tasks, such as classification, summarization, translation, generation, and dialogue.

In an aspect, the present disclosure provides techniques for an interface between a user and a large language model to use multiple queries to implement a workflow. The LLM receives a first prompt to transform a first input data source in a first format to a second format. The LLM receives a second prompt to define multiple steps of a workflow starting on the data source in the second format. The LLM receives a third prompt to define execution of business logic for each step of the workflow. The LLM executes each step of the workflow.

Implementations of the present disclosure may realize one or more of the following technical effects. The use of a LLM allows faster development of automated workflows. Further, because the prompts may be written in natural language and/or pseudocode, the use of the LLM provides cross-platform compatibility of workflows for execution in environments supporting different programming models and/or languages. Additionally, the use of the LLM for code-less workflow execution facilitates easier modification and maintenance of workflows.

Turning now to FIGS. 1-7, examples are depicted with reference to one or more components and one or more methods that may perform the actions or operations described herein, where components and/or actions/operations in dashed line may be optional. Although the operations described below in FIG. 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a conceptual diagram 100 of an example of an architecture for a system 120 to automate a workflow using a large language model (LLM) 140. The system 120 may be, for example, a cloud network including computing resources that are controlled by a network operator and accessible to public clients such as a user device 110 operated by a user 105. For example, the system 120 may include a plurality of datacenters 122 that include computing resources such as computer memory and processors. In some implementations, the datacenters 122 may host a compute service that provides computing nodes on computing resources located in the datacenter. The computing nodes may be container-ized execution environments with allocated computing resources. For example, the computing nodes may be virtual machines (VMs), process-isolated containers, or kernel-isolated containers. The nodes may be instantiated at a datacenter 122 and imaged with software (e.g., operating system and applications for a service). The system 120 may include edge routers that connect the datacenters 122 to external networks such as internet service providers (ISPs) or other autonomous systems (ASes) that form the Internet.

The system 120 may provide a large language model (LLM) 140 that is configured to receive a natural language prompt and output a response. The LLM 140 may be a specific instance or version of a LLM artificial intelligence that has been trained and fine-tuned on a large corpus of text. The LLM may be a Generalized Pre-trained Transformer (GPT) model. For example, a GPT model may include millions or billions of parameters trained on vast amounts of data (e.g., gigabytes or terabytes of text). A GPT model is a type of neural network that uses a transformer architecture to learn from large amounts of text data. The model has two main components: an encoder and a decoder. The encoder processes the input text and converts it into a sequence of vectors, called embeddings, that represent the meaning and context of each word. The decoder generates the output text by predicting the next word in the sequence, based on the embeddings and the previous words. The model uses a technique called attention to focus on the most relevant parts of the input and output texts, and to capture long-range dependencies and relationships between words. The model is trained by using a large corpus of texts as both the input and the output, and by minimizing the difference between the predicted and the actual words. The model can then be fine-tuned or adapted to specific tasks or domains, by using smaller and more specialized datasets.

The LLM 140 may provide an application programming interface (API) that allows other applications to interact with the LLM 140. For example, the API may allow a user or application to provide a prompt to the LLM 140. Prompts are the inputs or queries that a user or a program gives to an LLM AI, in order to elicit a specific response from the model. Prompts can be natural language sentences or questions, or code snippets or commands, or any combination of text or code, depending on the domain and the task. Prompts can also be nested or chained, meaning that the output of one prompt can be used as the input of another prompt, creating more complex and dynamic interactions with the model.

The workflow automation application 130 may be an application that interfaces between the LLM 140 and user 105. For example, the workflow automation application 130 may provide a graphical user interface 132 on the user device 110 for the user 105. The workflow automation application 130 may receive a natural language prompt 112 and/or a workflow document 114 from the user 105. The workflow automation application 130 may generate and structure a series of ordered prompts 144 based on the natural language prompt 112 and/or a workflow document 114. For example, the ordered prompts 144 may include chaining and/or nesting The workflow automation application 130 may provide the ordered prompts 144 to the LLM 140. The LLM may execute each step of the workflow based on the prompts and generate an output data file 146, which the workflow automation application 130 may provide to the user 105 and/or the user device 110.

In some implementations, the workflow automation application 130 includes a document analyzer 134 configured to generate the prompts based on the workflow document 114.

The document analyzer 134 may utilize the LLM 140 to extract information from the workflow document to use in the prompts. For example, the document analyzer 134 may prompt the LLM 140 with the workflow document 114 and a request to extract workflow content 142 including a first format of an input data source, a second format of data used in the workflow, and multiple steps identified in the workflow document 114. In some implementations, the document analyzer 134 may automatically generate the prompts based on the workflow document 114. In some implementations, the workflow analyzer 134 may pre-populate the user interface 132 with the information extracted from the workflow document 114. The user 105 may then review or edit the prompts before submitting the prompts to the LLM 140.

In some implementations, the workflow automation application 130 includes a prompt verifier 136 configured to verify whether text entered into each of the fields of the user interface 132 includes required content for each prompt. As explained in further detail below, the prompts may include a first prompt to transform an input data source, a second prompt to orchestrate steps of the workflow, and one or more third prompts to define business logic for each of the steps. The prompt verifier 136 may determine whether a draft prompt includes required information for each type of prompt. For instance, the prompt verifier 136 may determine whether the first prompt includes an input data format and an output data format. The prompt verifier 136 may determine whether the second prompt defines multiple steps and whether each step defines an input. The prompt verifier 136 may determine whether the third prompt includes an operation or reference to executable code.

In some implementations, the workflow automation application 130 includes a saved context 138. The saved context 138 may include output from the LLM 140 that is saved for use in further prompts. In some implementations, the saved context 138 may be stored within the LLM 140. In some implementations, the saved context 138 may include state parameters of the LLM 140 such as embeddings of prior prompts.

In some implementations, the workflow automation application 130 includes local executables 139. The local executables 139 may be executable code that can be referenced within a prompt. For example, some workflow tasks may have been previously defined by executable code, which can be saved as a local executable 139. As another example, some workflow steps may be too complicated to define in a prompt, so the step may be coded as needed.

Figure 2:
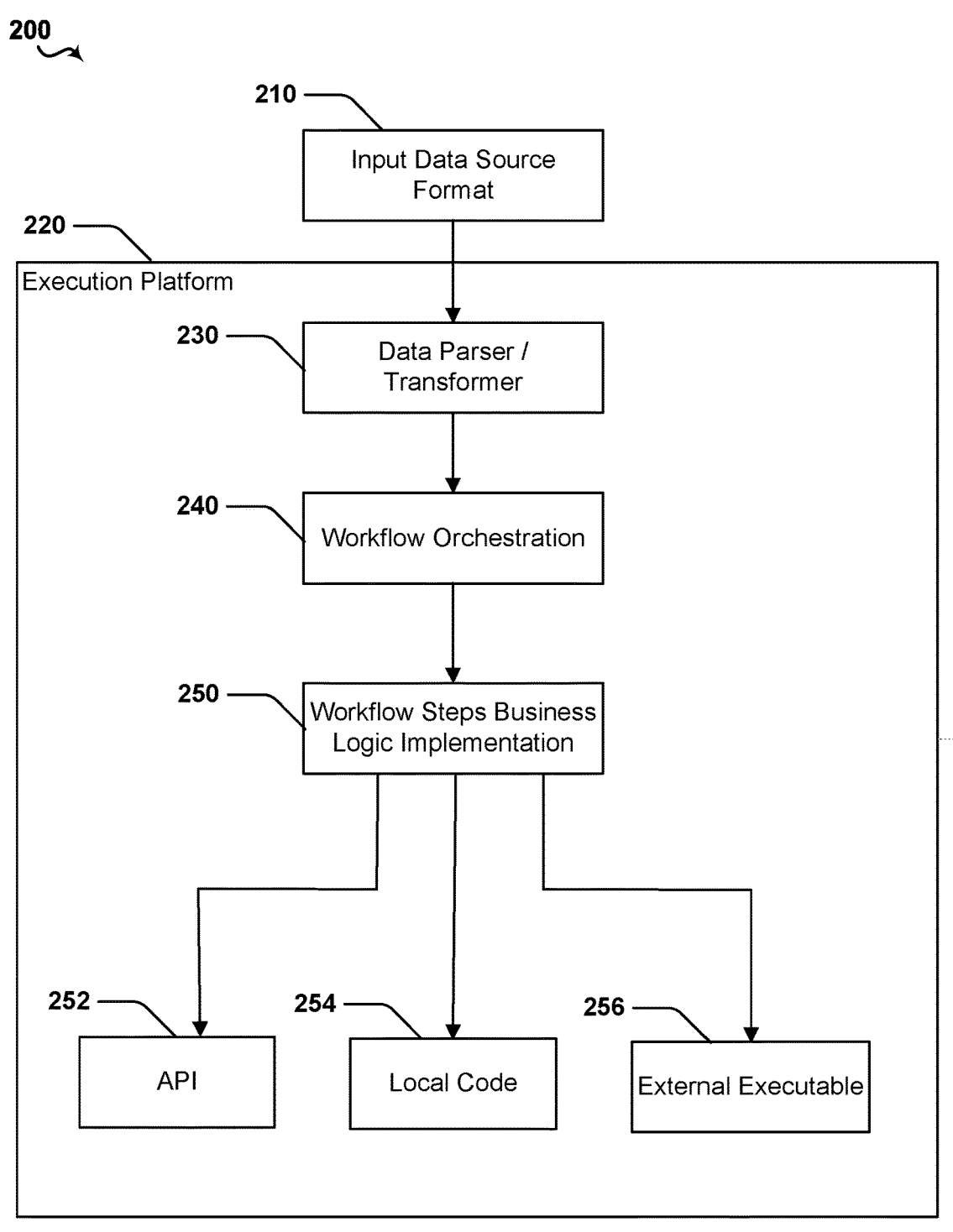
FIG. 2 is a conceptual diagram of an example technique for workflow execution on an execution platform.

FIG. 2 is a conceptual diagram 200 of an example technique for workflow execution on an execution platform 220 such as an individual computer or cloud network. Generally, an input data source 210 has a format that is not platform specific. For example, known formats such as xml, JSON, and text may be used to store data external to the execution platform 220.

The execution platform 220 may include a data parser or transformer 230 that is configured to parse or transform the input data source format to an internal format. The data parser or transformer 230 is conventionally written in code and is both platform specific and data model specific. If a workflow is moved to a different execution platform with either a different programming model (e.g., programming language) or data model, the data parser or transformer 230 may need to be modified, which may require multiple development and testing cycles.

The execution platform 220 may include a workflow orchestration component 240 that is configured to execute workflow steps in order. Like the data parser or transformer

230, the workflow orchestration component 240 may be platform specific. Although the workflow orchestration component 240 may provide flexibility in programming an order of steps, the workflow orchestration component 240 itself may be subject to platform requirements such as a programming model.

The workflow steps business logic implementation 250 may include code configured to perform the specific business logic of each step of the workflow. The workflow steps business logic implementation 250 is generally platform specific. In some implementations, the business logic implementation 250 may call an API 252, local code 254, or external executable 256. Although such interfaces are designed for interoperability, the integration of downstream and external components may still require customization of the business logic implementation 250. For instance, an API call may be subject to platform specific parsing of an internal data model.

Figure 3:
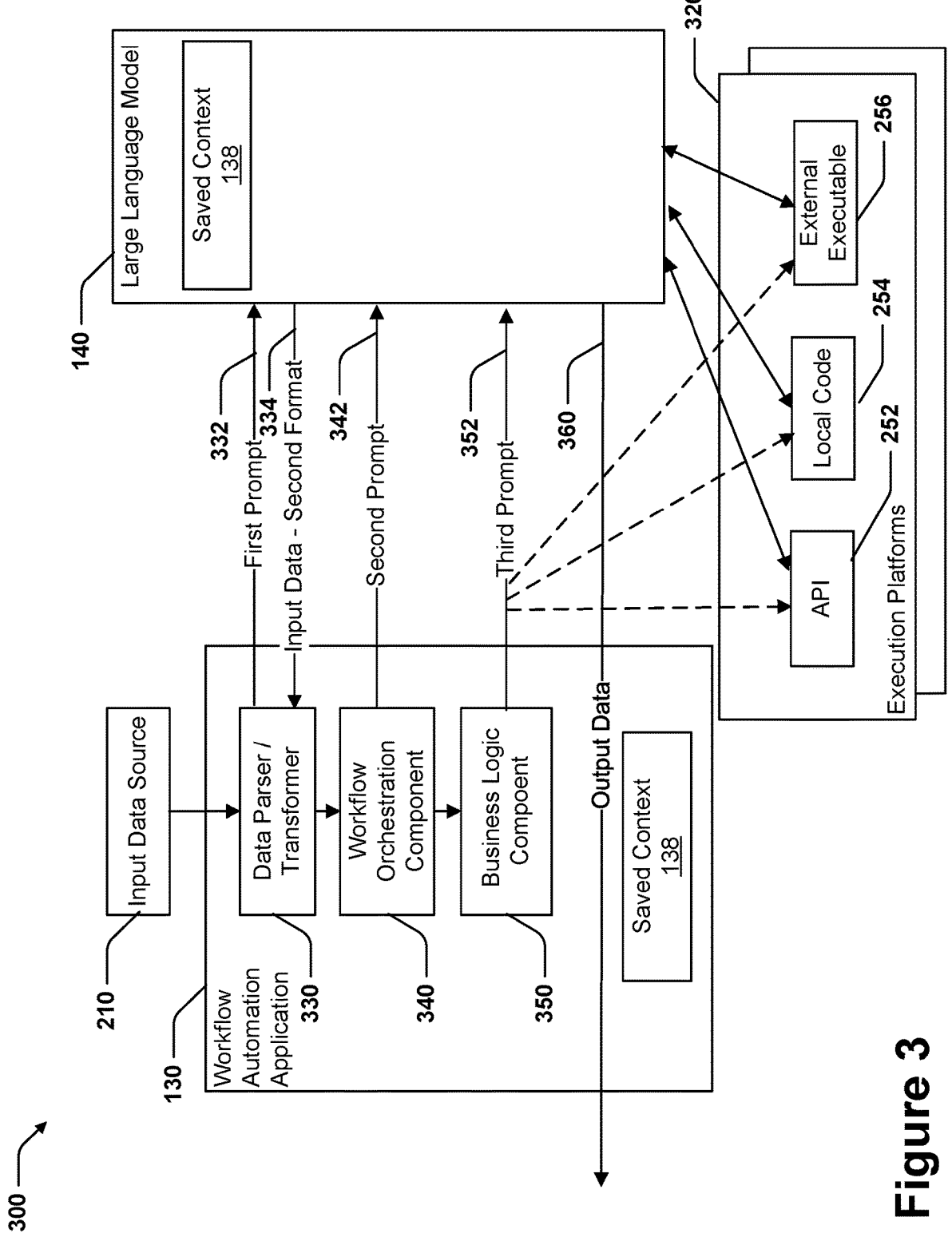
FIG. 3 is a conceptual diagram of an example technique for workflow execution using a LLM.

FIG. 3 is a conceptual diagram 300 of an example technique for workflow execution using a LLM 140. The input data source 210 is external to an execution platform 320. The workflow automation application 130 may be executed on an execution platform, but the workflow components may generate platform independent prompts for the LLM 140.

A data parser or transformer 330 is configured to output a first prompt 332 at the LLM to transform a first input data source in a first format to a second format.

A workflow orchestration component 340 is configured to output a second prompt 342 to define multiple steps of a workflow starting on the data source in the second format.

A workflow steps business logic component 350 is configured to output a third prompt 352 to define execution of business logic for each step of the workflow. In some implementations, the third prompt 352 may define the business logic in natural language or pseudocode, which may be understood by the LLM 140, which generates a response. In some implementations, the third prompt 352 may reference code that can be executed by the LLM 140. For instance, the third prompt 352 may refer to an API 252, local code 254, or external executable 256. In an implementation, the third prompt 352 may indicate information for adapting an execution platform for executing the code. For instance, the prompt may identify the execution platform or API contract such that the LLM 140 can correctly call the API.

The LLM 140 receives each of the first prompt 332, second prompt 342, and third prompt 352 as input and generates output data 360. That is, the first prompt 332 causes the LLM 140 to process the input data source 210 in a first format to transform the input data source 210 to a second format 334. The second prompt 342 causes the LLM 140 to orchestrate the multiple steps of the workflow. In some implementations, one or more of the third prompt 352 are nested within the second prompt 342 to perform the business logic of each workflow step. Accordingly, the one or more third prompts 352 cause the LLM 140 perform the business logic, and the results are used within the second prompt 342, for example, as input data to the next step. The output data 360 may be defined by the second prompt 342 or the result of a last of the third prompt 352. For example, the output data 360 may be a file created by the workflow, a reference to a file that has been modified by the workflow, or an indication that the workflow is completed.

Figure 4A:
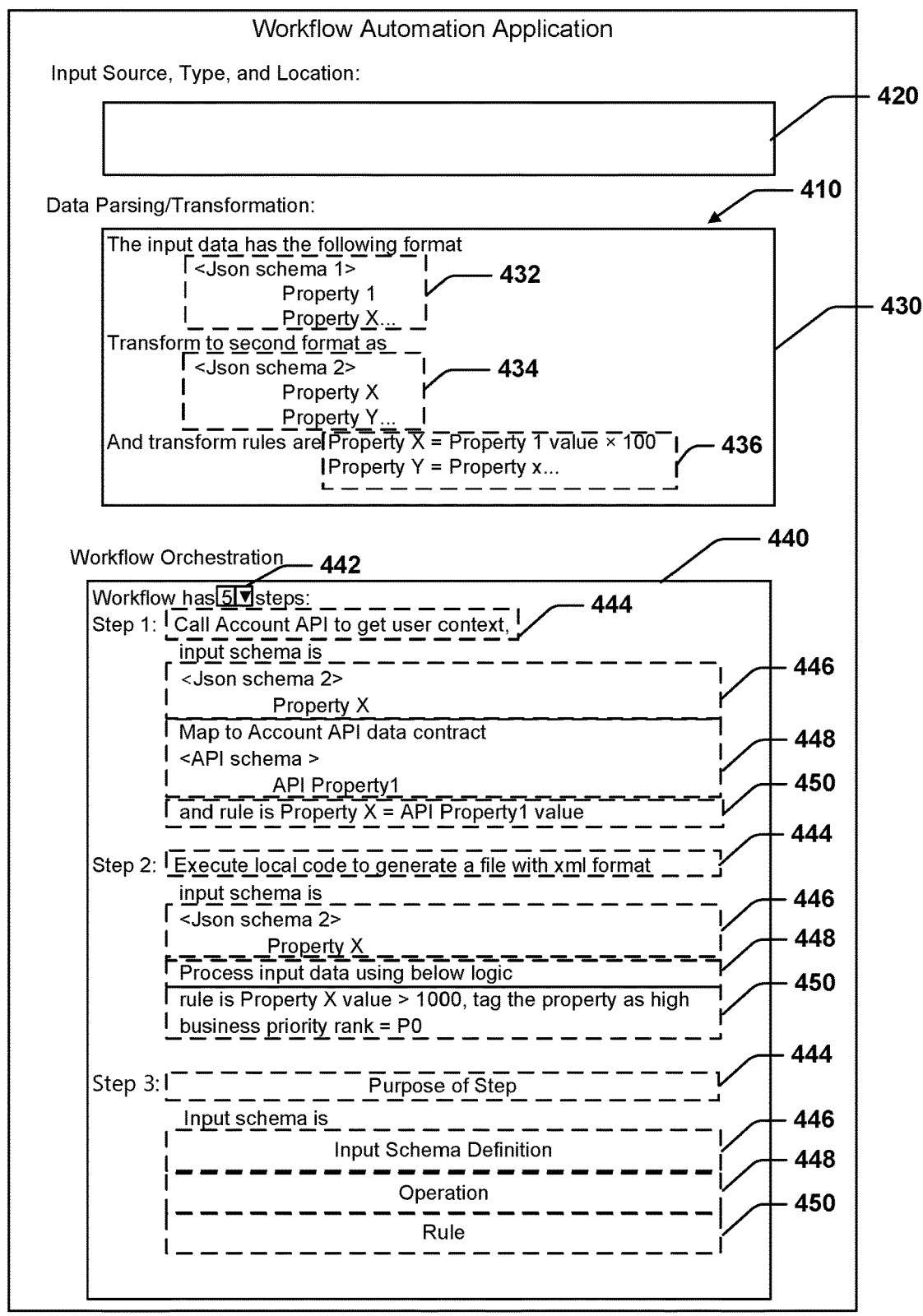

FIGS. 4A and 4B are diagrams of an example user interface 400 for a workflow automation application for generating prompts. The user interface 400 includes a plurality of fields 410 for entering the first prompt 332, the second prompt 342, and the third prompt 352. FIG. 4A includes fields 410 corresponding to the first prompt 332 and the second prompt 342. FIG. 4B includes fields 410 corresponding to the third prompt 352.

In some implementations, the user interface 400 includes a field 420 for identifying an input source, for example, by name, type, and location. The field 420 may be another input mechanism such as one or more pick lists or a file browser.

In some implementations, the user interface 400 may present an empty field for a user to enter a prompt. In other implementations, the user interface 400 may structure a field to provide guidance to a user to include required information in a prompt. For instance, a field may include initial text which may define a structure of the prompt and sub-fields where a user may enter information to complete the prompt. In cases where information is extracted from a workflow document, the sub-fields may include initial text, which may be edited by a user.

A field 430 for the first prompt 332 includes an introduction of an input data format followed by a sub-field 432 for defining the input data format. The field 430 further includes an introduction to the second format followed by a sub-field 434 for defining the second format. The field 430 also includes an introduction to transform rules followed by a sub-field 436 for defining the transform rules.

A field 440 for the second prompt 342 may include initial text with a picklist 442 to select a number of steps. The field 440 may then include an introduction to each step followed by one or more sub-fields for defining the respective step. In some implementations, the sub-fields may include a purpose of the step 444, an input schema definition 446, an operation 448, and a rule 450. For example, as illustrated for the first step, the purpose of the step 444 is "Call account API to get user context." The input schema definition 446 defines a JSON schema. The operation 448 defines a mapping of the input schema to an API data contract. The rule 450 defines a relationship between a property of the JSON schema and the API data contract. As another example, for the second step, the purpose of the step 444 is "Execute local code to generate a file with xml format." The input schema definition 446 defines the same input schema as in the first step. The operation 448 defines data processing. The rule 450 defines business logic for processing the input data.

In some implementations, the user interface 400 provides a template for defining the steps. For instance, the third step includes the introduction to the input schema, but the sub-fields include descriptions of the sub-fields rather than initial text. Accordingly, the user interface 400 provides structure for generating a prompt for performing a step of a workflow.

The user interface 400 in FIG. 4B includes fields 410 for generating prompts to perform the business logic of individual steps. For example, the field 460 may define a prompt to implement the first step by posting JSON data to a REST API endpoint using Java. In some implementations, the LLM 140 may generate the Java code based on a more general prompt that defines the platform specific requirements such as data model, API type, and location. As another example, the field 470 may include a prompt to execute a local executable file on the input schema.

Figure 5:
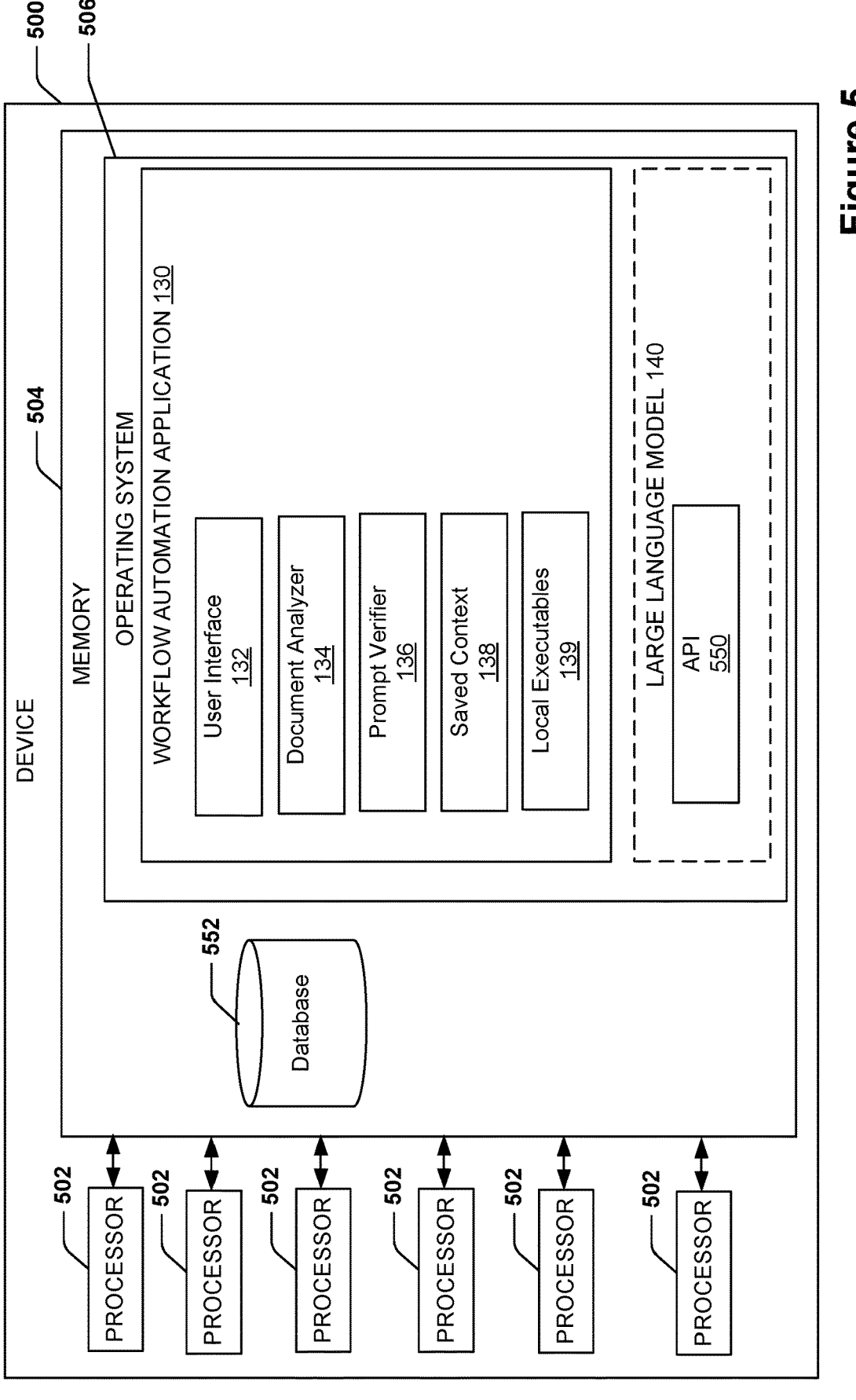
FIG. 5 is a schematic diagram of an example of an apparatus for implementing a workflow using a LLM.

FIG. 5 is a schematic diagram of an example of an apparatus 500 (e.g., a computing device) for implementing a workflow using the LLM 140. The apparatus 500 may be implemented as one or more computing devices in the system 120.

In an example, the apparatus 500 includes at least one processor 502 and a memory 504 configured to execute or store instructions or other parameters related to providing an operating system 506, which can execute one or more applications or processes, such as, but not limited to, the workflow automation application 130. For example, processors 502 and memory 504 may be separate components communicatively coupled by a bus (e.g., on a motherboard or other portion of a computing device, on an integrated circuit, such as a system on a chip (SoC), etc.), components integrated within one another (e.g., a processor 502 can include the memory 504 as an on-board component), and/or the like. Memory 504 may store instructions, parameters, data structures, etc. for use/execution by processor 502 to perform functions described herein. In some implementations, the memory 504 includes the database 552 for use by the workflow automation application 130. In some implementations, the apparatus 500 includes the LLM 140, for example, as another application executing on the processors 502. Alternatively, the LLM 140 may be executed on a different device that may be accessed via an API 550.

In an example, the workflow automation application 130 includes the user interface 132, the document analyzer 134, the prompt verifier 136, the saved context 138, and the local executables 139 discussed above with respect to FIG. 1.

The workflow automation application 130 may further include a data parser or transformer 330 configured to send a first prompt to a large language model (LLM) to transform a first input data source in a first format to a second format. The workflow automation application 130 may further include a workflow orchestration component 340 configured to send a second prompt to the LLM to define multiple steps of a workflow starting on the data source in the second format. The workflow automation application 130 may further include a business logic component 350 configured to send a third prompt to the LLM to define execution of business logic for each step of the workflow. The workflow automation application 130 may be configured to receive, from the LLM, output data indicating that each step of the workflow has been executed.

In some implementations, the apparatus 500 is implemented as a distributed processing system, for example, with multiple processors 502 and memories 504 distributed across physical systems such as servers, virtual machines, or datacenters 122. For example, one or more of the components of the workflow automation application 130 may be implemented as services executing at different datacenters 122. The services may communicate via an API.

FIG. 6 is a flow diagram of an example of a method 600 for executing a workflow using a large language model. For example, the method 600 can be performed by the workflow automation application 130, the apparatus 500 and/or one or more components thereof to automate workflows using the LLM 140.

At block 610, the method 600 may optionally include receiving a workflow document and a prompt to extract the first format, the second format, and the multiple steps. For example, in an aspect, apparatus 500, processor 502, memory 504, and/or workflow automation application 130 may be configured to or may comprise means for receiving a workflow document and a prompt to extract the first format, the second format, and the multiple steps. For example, the workflow automation application 130 may receive the workflow document 114 from the user device 110. The workflow automation application 130 may add a prompt for the LLM 140 to extract the first format (e.g., of input data source 210), the second format (e.g., a transformed format 334), and the multiple steps.

Referring to an alternative or additional aspect, at block 620, the method 600 may further include providing a user interface with fields to enter the first prompt, the second prompt, and the third prompt. For example, in an aspect, apparatus 500, processor 502, memory 504, workflow automation application 130, and/or user interface 132 may be configured to or may comprise means for providing a user interface 400 with fields 410 to enter the first prompt 332, the second prompt 342, and the third prompt 352. In some implementations, the user interface 400 may prepopulate the fields 410 based on information extracted from the workflow document 114. For example, the user interface may insert the first format into the sub-field 432 and insert the second format into the sub-field 434.

Referring to an alternative or additional aspect, at block 630, the method 600 may further include verifying whether text entered into each of the fields includes required content for each prompt. For example, in an aspect, apparatus 500, processor 502, memory 504, workflow automation application 130, and/or prompt verifier 136 may be configured to or may comprise means for verifying whether text entered into each of the fields 410 includes required content for each prompt. For example, the prompt verifier 136 may ensure that each sub-field includes content that matches a rule for the sub-field.

At block 640, the method 600 includes receiving a first prompt at the LLM to transform a first input data source in a first format to a second format. For example, in an aspect, apparatus 500, processor 502, memory 504, and/or the LLM 140 may be configured to or may comprise means for receiving the first prompt 332 at the LLM 140 to transform a first input data source 210 in a first format to a second format. For example, the LLM 140 may receive the first prompt 332 from the workflow automation application 130 and/or the data parser or transformer 330. For example, the data parser or transformer 330 may output the first prompt 332 based on the field 430. The workflow automation application 130 may call the API 550 for the LLM 140 with the first prompt 332. In some implementations, the first prompt 332 defines an input data format (e.g., in sub-field 432), an output data format (e.g., in sub-field 434), and a transformation rule (e.g., in sub-field 436).

At block 650, the method 600 may optionally include outputting a transformed data set in the output data format to a local memory. For example, in an aspect, apparatus 500, processor 502, memory 504, and/or the LLM 140 may be configured to or may comprise means for outputting a transformed data set in the output data format to a local memory (e.g., memory 504 and/or saved context 138). For example, the LLM 140 may output the transformed data set in the output data format to the workflow automation application 130 for storage and local operations. For instance, the workflow automation application 130 may select data from the transformed data set when generating the second prompt 342 and/or the third prompt 352.

At block 660, the method 600 includes receiving a second prompt at the LLM to define multiple steps of a workflow starting on the data source in the second format. For example, in an aspect, apparatus 500, processor 502, memory 504, and/or the LLM 140 may be configured to or may comprise means for receiving the second prompt 342 at the LLM to define multiple steps of a workflow starting on the data source in the second format. For example, the LLM 140 may receive the second prompt 342 from the workflow automation application 130 and/or the workflow orchestration component 340. For example, the workflow orchestration component 340 may output the second prompt 342 based on the field 440. The workflow automation application 130 may call the API 550 for the LLM 140 with the second prompt 342. In some implementations, the second prompt 342 identifies, for a first step, a property of the input data source in the second format (e.g., input schema definition 446) and an operation on the property (e.g., operation 448). In some implementations, the second prompt 342 identifies a rule for performing the operation (e.g., rule 450).

At block 670, the method 600 includes receiving a third prompt at the LLM to define execution of business logic for each step of the workflow. For example, in an aspect, apparatus 500, processor 502, memory 504, and/or the LLM 140 may be configured to or may comprise means for receiving the third prompt 352 at the LLM 140 to define execution of business logic for each step of the workflow. For example, the LLM 140 may receive the third prompt 352 from the workflow automation application 130 and/or the business logic component 350. For example, the business logic component 350 may output the third prompt 352 based on the field 460 or 470 corresponding to a respective step of the workflow. The workflow automation application 130 may call the API 550 for the LLM 140 with the third prompt 352. In some implementations, the third prompt 352 calls for execution of code via one or more of an API 252, local code 254, or an external executable 256. The LLM 140 may determine how to execute the code on the respective execution platform 320.

Referring to an alternative or additional aspect, at block 680, the method 600 may further include nesting the third prompt within a corresponding step of the second prompt. For example, in an aspect, apparatus 500, processor 502, memory 504, the workflow automation application 130, and/or the LLM 140 may be configured to or may comprise means for nesting the third prompt 352 within a corresponding step of the second prompt 342. In some implementations, the workflow automation application 130 may nest the third prompt 352 prior to sending the second prompt 342 to the LLM 140. In other implementations, when orchestrating the workflow according to the second prompt 342, the LLM 140 may locate the third prompt 352 and nest the third prompt 352 at the corresponding step of the workflow.

At block 690, the method 600 includes executing, by the LLM, each step of the workflow. For example, in an aspect, apparatus 500, processor 502, memory 504, and/or the LLM 140 may be configured to or may comprise means for executing, by the LLM 140, each step of the workflow. For example, the LLM 140 may evaluate each of the first prompt 332, the second prompt 342, and the third prompt 352. When executing the second prompt 342, the LLM 140 may store the output of a previous step as saved context 138 and/or return the output to the workflow automation application 130 for inclusion in a subsequent prompt (e.g., a third prompt 352). In some implementations, executing a step of a workflow may include executing code as defined by the third prompt 352. The LLM 140 may output the output data 360 to the workflow automation application 130 after executing each step of the workflow.

Figure 7:
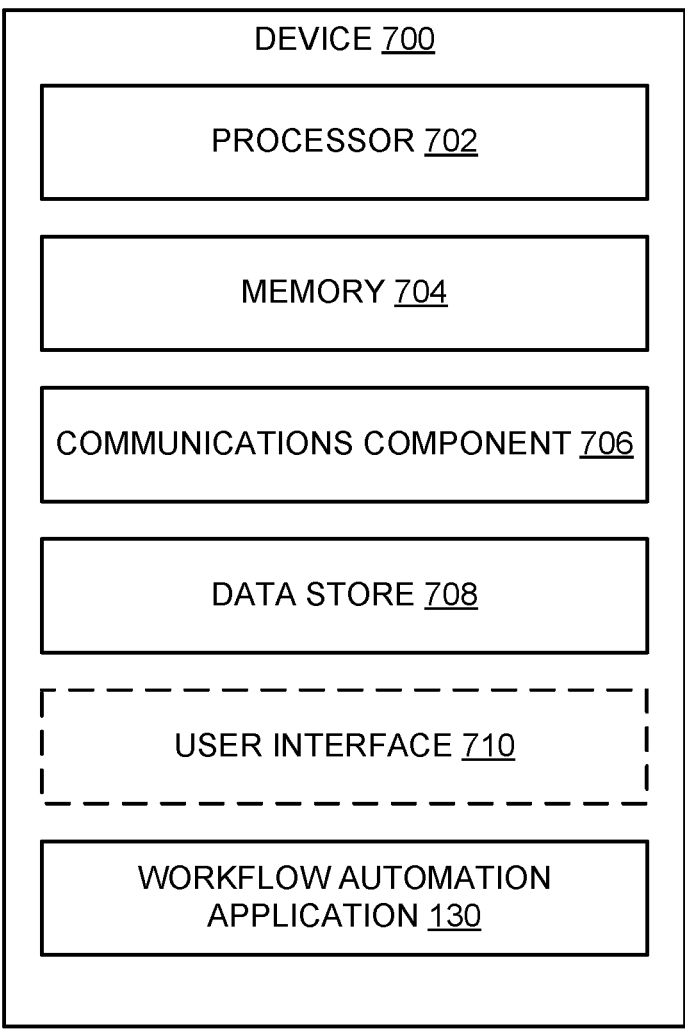
FIG. 7 illustrates an example of a device including additional optional component details as those shown in FIG. 5.

FIG. 7 illustrates an example of a device 700 including additional optional component details as those shown in FIG. 5. In one aspect, device 700 includes processor 702, which may be similar to processor 702 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 further includes memory 704, which may be similar to memory 504 such as for storing local versions of operating systems (or components thereof) and/or applications being executed by processor 702, such as the workflow automation application 130, user interface 132, document analyzer 134, prompt verifier 136, etc. Memory 704 can include a type of memory usable by a computer, such as random access memory (RAM), read only memory (ROM), tapes, magnetic discs, optical discs, volatile memory, non-volatile memory, and any combination thereof. The processor 702 may execute instructions stored on the memory 704 to cause the device 700 to perform the methods discussed above with respect to FIGS. 4-7.

Further, device 700 includes a communications component 706 that provides for establishing and maintaining communications with one or more other devices, parties, entities, etc. utilizing hardware, software, and services as described herein. Communications component 706 carries communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc. not currently being executed by processor 702. In addition, data store 708 may be a data repository for the workflow automation application 130.

Device 700 may optionally include a user interface component 710 operable to receive inputs from a user of device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 additionally includes the workflow automation application 130 for automating a workflow using the LLM 140.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The following numbered clauses provide an overview of aspects of the present disclosure:

Clause 1. A method of implementing a workflow using a large language model (LLM) comprising: receiving a first prompt at the LLM to transform a first input data source in a first format to a second format; receiving a second prompt at the LLM to define multiple steps of a workflow starting on the data source in the second format; receiving a third prompt at the LLM to define execution of business logic for each step of the workflow; and executing, by the LLM, each step of the workflow.

Clause 2. The method of clause 1, wherein the first prompt defines an input data format, an output data format, and a transformation rule.

Clause 3. The method of clause 2, further comprising outputting a transformed data set in the output data format to a local memory.

Clause 4. The method of any of clauses 1-3, wherein the second prompt identifies, for a first step, a property of the input data source in the second format and an operation on the property.

Clause 5. The method of any of clauses 1-4, wherein the third prompt calls for execution of code via one or more of an application programming interface, a local executable file, or an external executable.

Clause 6. The method of any of clauses 1-5, further comprising nesting the third prompt within a corresponding step of the second prompt.

Clause 7. The method of any of clauses 1-6, further comprising receiving a workflow document and a prompt to extract the first format, the second format, and the multiple steps.

Clause 8. The method of any of clauses 1-7, further comprising: providing a user interface with fields to enter the first prompt, the second prompt, and the third prompt; and verifying whether text entered into each of the fields includes required content for each prompt.

Clause 9. An apparatus comprising: one or more memories; and one or more processors coupled with the memory and, individually or in combination, configured to: send a first prompt to a large language model (LLM) to transform a first input data source in a first format to a second format; send a second prompt to the LLM to define multiple steps of a workflow starting on the data source in the second format; send a third prompt to the LLM to define execution of business logic for each step of the workflow; and receive, from the LLM, output data indicating that each step of the workflow has been executed.

Clause 10. The apparatus of clause 1, wherein the first prompt defines an input data format, an output data format, and a transformation rule.

Clause 11. The apparatus of clause 10, wherein the one or more processors, individually or in combination, are configured to receive a transformed data set in the output data from the LLM in response to the first prompt.

Clause 12. The apparatus of any of clauses 9-11, wherein the second prompt identifies, for a first step, a property of the input data source in the second format and an operation on the property.

Clause 13. The apparatus of any of clauses 9-12, wherein the third prompt calls for execution of code via one or more of an application programming interface, a local executable file, or an external executable.

Clause 14. The apparatus of any of clauses 9-13, wherein the one or more processors, individually or in combination, are configured to nest the third prompt within a corresponding step of the second prompt.

Clause 15. The apparatus of any of clauses 9-14, wherein the one or more processors, individually or in combination, are configured to send a workflow document and a prompt to extract the first format, the second format, and the multiple steps to the LLM.

Clause 16. The apparatus of any of clauses 9-15, wherein the one or more processors, individually or in combination, are configured to: provide a user interface with fields to enter the first prompt, the second prompt, and the third prompt; and verify whether text entered into each of the fields includes required content for each prompt.

Clause 17. A non-transitory computer-readable medium having computer-executable instructions stored thereon that when executed by a computer processor cause the computer processor to: send a first prompt to a large language model (LLM) to transform a first input data source in a first format to a second format; send a second prompt to the LLM to define multiple steps of a workflow starting on the data source in the second format; send a third prompt to the LLM to define execution of business logic for each step of the workflow; and receive, from the LLM, output data indicating that each step of the workflow has been executed.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of implementing a workflow using a large language model (LLM) comprising:
  receiving, by the LLM, a first prompt that causes the LLM to process a first input data source in a first format and output a transformed data source in a second format;
  receiving, by the LLM, a second prompt that causes the LLM to output a workflow that defines multiple steps of the workflow starting on the transformed data source in the second format;
  receiving, by the LLM, a third prompt that defines logic for each step of the workflow, wherein the third prompt is nested within a corresponding step of the workflow produced by the second prompt; and
  executing, by the LLM, each step of the workflow including the logic defined by the third prompt.

2. The method of claim 1, wherein the first prompt defines an input data format, an output data format, and a transformation rule.

3. The method of claim 2, further comprising outputting a transformed data set in the output data format to a local memory.

4. The method of claim 1, wherein the second prompt identifies, for a first step, a property of the transformed data source in the second format and an operation on the property.

5. The method of claim 1, wherein the third prompt requests execution of code via one or more of an application programming interface, a local executable file, or an external executable.

6. The method of claim 1, further comprising receiving a workflow document and a prompt to extract the first format, the second format, and the multiple steps.

7. The method of claim 1, further comprising:
  providing a user interface with fields to enter the first prompt, the second prompt, and the third prompt; and
  verifying whether text entered into each of the fields includes required content for each prompt.

8. An apparatus comprising:
  one or more memories; and
  one or more processors coupled with the one or more memories and, individually or in combination, configured to:
    send a first prompt to a large language model (LLM) to cause the LLM to process a first input data source in a first format and output a transformed data source into a second format;
    send a second prompt to the LLM to cause the LLM to output a workflow that defines multiple steps of the workflow starting on the transformed data source in the second format;
    generate one or more third prompts to the LLM that define logic for one or more corresponding steps of the workflow;
    nest the one or more third prompts within the one or more corresponding steps of the workflow produced by the second prompt;
    prompt the LLM to execute each step of the workflow including the logic defined by the one or more third prompts; and receive, from the LLM, output data indicating that each step of the workflow has been executed.

9. The apparatus of claim 8, wherein the first prompt defines an input data format, an output data format, and a transformation rule.

10. The apparatus of claim 9, wherein the one or more processors, individually or in combination, are configured to receive a transformed data set in the output data from the LLM in response to the first prompt.

11. The apparatus of claim 8, wherein the second prompt identifies, for a first step, a property of the transformed data source in the second format and an operation on the property.

12. The apparatus of claim 8, wherein the one or more third prompts request execution of code via one or more of an application programming interface, a local executable file, or an external executable.

13. The apparatus of claim 8, wherein the one or more processors, individually or in combination, are configured to send a workflow document and a prompt to extract the first format, the second format, and the multiple steps to the LLM.

14. The apparatus of claim 8, wherein the one or more processors, individually or in combination, are configured to:

provide a user interface with fields to enter the first prompt, the second prompt, and the third prompt; and verify whether text entered into each of the fields includes required content for each prompt.

15. A non-transitory computer-readable medium having computer-executable instructions stored thereon that when executed by a computer processor cause the computer processor to:

send a first prompt to a large language model (LLM) to cause the LLM to process a first input data source in a first format and output a transformed data source in to a second format;

send a second prompt to the LLM to cause the LLM to output a workflow that defines multiple steps of the workflow starting on the transformed data source in the second format;

generate one or more third prompts to the LLM that define logic for one or more corresponding steps of the workflow;

nest the one or more third prompts within the one or more corresponding steps of the workflow produced by the second prompt;

prompt the LLM to execute each step of the workflow including the logic defined by the one or more third prompts; and receive, from the LLM, output data indicating that each step of the workflow has been executed.

16. The non-transitory computer-readable medium of claim 15, wherein the first prompt defines an input data format, an output data format, and a transformation rule.

17. The non-transitory computer-readable medium of claim 15, wherein the second prompt identifies, for a first step, a property of the transformed data source in the second format and an operation on the property.

18. The non-transitory computer-readable medium of claim 15, wherein the one or more third prompts request execution of code via one or more of an application programming interface, a local executable file, or an external executable.

\*    \*    \*    \*    \*